(12) United States Patent
Chae et al.

(10) Patent No.: US 12,112,571 B2
(45) Date of Patent: Oct. 8, 2024

(54) NEURAL NETWORK-BASED KEY POINT TRAINING APPARATUS AND METHOD

(71) Applicant: DEEPBRAIN AI INC., Seoul (KR)

(72) Inventors: Gyeongsu Chae, Seoul (KR); Guembuel Hwang, Seoul (KR)

(73) Assignee: DEEPBRAIN AI INC., Seoul (KR)

(*) Notice: Subject to any disclaimer, the term of this patent is extended or adjusted under 35 U.S.C. 154(b) by 387 days.

(21) Appl. No.: 17/762,819

(22) PCT Filed: Dec. 1, 2020

(86) PCT No.: PCT/KR2020/017404
§ 371 (c)(1),
(2) Date: Mar. 23, 2022

(87) PCT Pub. No.: WO2022/004970
PCT Pub. Date: Jan. 6, 2022

(65) Prior Publication Data
US 2022/0343679 A1    Oct. 27, 2022

(30) Foreign Application Priority Data
Jul. 1, 2020    (KR) .......................... 10-2020-0081147

(51) Int. Cl.
*G06V 40/16*    (2022.01)
*G06T 11/00*    (2006.01)
*G06V 10/774*    (2022.01)
*G06V 10/82*    (2022.01)

(52) U.S. Cl.
CPC ............ *G06V 40/171* (2022.01); *G06T 11/00* (2013.01); *G06V 10/774* (2022.01); *G06V 10/82* (2022.01)

(58) Field of Classification Search
CPC . G06N 3/04; G06N 3/08; G06T 11/00; G06V 10/774; G06V 10/778; G06V 10/82; G06V 40/168; G06V 40/171
See application file for complete search history.

(56) References Cited

U.S. PATENT DOCUMENTS

| | | | |
|---|---|---|---|
| 10,635,917 B1 | 4/2020 | Kim et al. | |
| 11,347,973 B2 | 5/2022 | Rhee et al. | |
| 2022/0215580 A1* | 7/2022 | Gupta | ........................ G06T 7/74 |

FOREIGN PATENT DOCUMENTS

| | | |
|---|---|---|
| JP | 11-213132 A | 8/1999 |
| JP | 2010-218051 A | 9/2010 |
| JP | 2015-26922 A | 2/2015 |
| KR | 10-0368743 B1 | 1/2003 |
| KR | 10-2019-0110320 A | 9/2019 |
| KR | 10-2020-0025889 A | 3/2020 |

OTHER PUBLICATIONS

International Search Report for PCT/KR2020/017404 mailed on Mar. 24, 2021.
Office action issued on Aug. 19, 2022 from Korean Patent Office in a counterpart Korean Patent Application No. 10- 2020-0081147(all the cited references are listed in this IDS.) (English translation is also submitted herewith.).

* cited by examiner

*Primary Examiner* — Michael J Vanchy, Jr.
(74) *Attorney, Agent, or Firm* — The PL Law Group, PLLC

(57) ABSTRACT

A neural network-based key point training apparatus according to an embodiment disclosed includes a key point model trained to extract key points from an input image and an image reconstruction model trained to reconstruct the input image with the key points output by the key point model as the input.

4 Claims, 4 Drawing Sheets

NEURAL NETWORK-BASED KEY POINT TRAINING APPARATUS AND METHOD

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/017404, filed Dec. 1, 2020, which claims priority to the benefit of Korean Patent Application No. 10-2020-0081147 filed in the Korean Intellectual Property Office on Jul. 1, 2020, the entire contents of which are incorporated herein by reference.

BACKGROUND

1. Technical Field

Embodiment of the present invention relates to key point training technology using a machine learning technique.

2. Background Art

Recently, with the advancement of technology in the field of artificial intelligence, various types of content are being created based on artificial intelligence technology. As an example, when there is a voice message to be delivered, there is a case in which the voice message is generated to attract people's attention by generating an utterance video of a famous person (e.g., a president, etc.) speaking. This is implemented by creating a mouth shape, etc. to fit a specific message, just like the famous person speaking a specific message in a video of the famous person.

Conventionally, for synthesizing such a lip sync facial image, facial key points were extracted from an input image and compared with correct answer values to minimize the differences between the facial key points and the correct answer values. However, since annotation noise exists in the correct answer values of facial key point data in the image, continuity over time is unstable, and accordingly, there is a problem in that image quality deteriorates when the lip sync facial image is synthesized based on the correct answers of the facial feature data.

That is, the correct values of the facial key point data in the image are obtained by labelling the key points while a person watches the image. Annotation noise inevitably exists due to reasons such as the standards are different for each person when several people work, it is impossible to take a corresponding point for each image frame even if the same person works, etc. In the past, facial key points are predicted using the correct answer values in which noise exists, and thus when a facial image is synthesized using the predicted facial key points, image quality is deteriorated such as shaking the image.

SUMMARY

Embodiments of the present invention are to provide neural network-based key point training apparatus and method capable of extracting key points that are continuous and stable over time.

Embodiments of the present invention are to provide the neural network-based key point training apparatus and method capable of improving image quality during key point-based image reconstruction.

A neural network-based key point training apparatus according to an embodiment disclosed comprises a key point model trained to extract key points from an input image and an image reconstruction model trained to reconstruct the input image with the key points output by the key point model as the input.

The key point model may be trained to minimize differences between the extracted key points and key points labelled with respect to the input image and the image reconstruction model may be trained to minimize a difference between the reconstructed image and the input image.

The key point model may be primarily trained to minimize the differences between the extracted key points and the key points labelled with respect to the input image and may be secondarily trained to extract the key points so that a difference between the reconstructed image and the input image is minimized.

The key point model may comprise an extraction module trained to extract a feature vector from the input image and a prediction module trained to predict key point coordinates of the input image based on the feature vector extracted by the extraction module, and the image reconstruction model may be trained to reconstruct the input image based on the key point coordinates output by the key point model.

Optimized parameters of the key point model and the image reconstruction model may be calculated through the following equation.

$$\theta^*, \varphi^* = \operatorname{argmin}_{\theta,\varphi}(\alpha L_{prediction} + \beta L_{reconstruction}) \quad \text{(Equation)}$$

$\theta^*$: optimized parameter of key point model
$\varphi^*$: optimized parameter of image reconstruction model
$L_{prediction}$: objective function of key point model, $$L_{prediction} = \|K - G(I;\theta)\|$$

K: labelled key point coordinates of input image
G: neural network constituting key point model
$\theta$: parameter of key point model
I: input image
$G(I;\theta)$: key point coordinates predicted from key point model
$\|K-G(I;\theta)\|$: function to find difference between key point coordinates predicted from key point model and labelled key point coordinates of input image
$L_{reconstruction}$: objective function of image reconstruction model, $L_{reconstruction} = \|I - D(G(I;\theta);\varphi)\|$
D: neural network constituting image reconstruction model
$\varphi$: parameter of image reconstruction model
$\|I-D(GI;\theta);\varphi)\|$: function to find difference between input image and image reconstructed by image reconstruction model
$\alpha$: weight of objective function of key point model
$\beta$: weight of objective function of image reconstruction model The key point model may comprise an extraction module trained to extract a feature tensor from the input image and a prediction module trained to predict a key point image based on the feature tensor extracted by the extraction module, and the image reconstruction model may be trained to reconstruct the input image based on the key point image output by the key point model.

The key point image may be an image indicating whether or not each pixel corresponds to the key point in an image space corresponding to the input image as a probability value.

An objective function $L_{prediction}$ of the key point model may be expressed through the following equation.

$$L_{prediction} = -\Sigma\{p_{target} * x_i, y_i)\log(p(x_i, y_i)) + (1 - p_{target}(x_i, y_i))\log(1 - p(x_i, y_i))\} \quad \text{(Equation)}$$

$p(x_i,y_i)$: probability value of whether or not pixel $p(x_i,y_i)$ is key point, $p(x_i,y_i)$=probability distribution $(P(F(x_i,y_i); \delta))$ P: neural network constituting key point model $F(x_i,y_i)$: feature tensor of pixel $(x_i,y_i)$ $\delta$: parameter of key point model $p_{target}(x_i,y_i)$: value of whether or not pixel $(x_i,y_i)$ of the input image is labelled key point.

Optimized parameters of the key point model and the image reconstruction model may be calculated through the following equation.

$$\delta^*,\eta^* = \mathrm{argmin}_{\delta,\eta}(\alpha L_{prediction} + \beta L_{reconstruction}) \quad \text{(Equation)}$$

$\delta^*$: optimized parameter of key point model $\eta^*$: optimized parameter of image reconstruction model $\alpha$: weight of objective function of key point model $\beta$: weight of objective function of image reconstruction model $L_{reconstruction}$: objective function of the image reconstruction model, $L_{reconstruction} = \|I - H(P(I;\delta);\eta)\|$ I: input image H: neural network constituting image reconstruction model $\eta$: parameter of image reconstruction model A key point training method according to one embodiment disclosed is a neural network-based training method performed in a computing device including one or more processors and a memory for storing one or more programs executed by the one or more processors, the method comprising a step of learning to extract key points from an input image, in a key point model, and a step of learning to reconstruct the input image with the key points output by the key point model as the input, in an image reconstruction model.

According to the embodiments disclosed, by performing training so that the key points are extracted from the input image in the key point model, and the input image is reconstructed from the key points of the key point model in the image reconstruction model, the key points that are continuous and stable over time can be extracted while training is in progress because the input image itself does not have noise over time (i.e., annotation noise) unlike the key points.

In addition, as the accuracy of key point extraction increases and key points are extracted that are stable over time, quality of the reconstructed image reconstructed by the image reconstruction model can also be improved.

DETAILED DESCRIPTION

Hereinafter, a specific embodiment of the present invention will be described with reference to the drawings. The following detailed description is provided to aid in a comprehensive understanding of the methods, apparatus and/or systems described herein. However, this is illustrative only, and the present invention is not limited thereto.

In describing the embodiments of the present disclosure, when it is determined that a detailed description of related known technologies related to the present invention may unnecessarily obscure the subject matter of the present invention, a detailed description thereof will be omitted. In addition, terms to be described later are terms defined in consideration of functions in the present invention, which may vary according to the intention or custom of users or operators. Therefore, the definition should be made based on the contents throughout this specification. The terms used in the detailed description are only for describing embodiments of the present invention, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, the terms "transfer", "communication", "transmission", "reception" and other terms with similar meanings include not only direct transmission of a signal or information from one component to another component, but also transmission through another component. In particular, "transferring" or "transmitting" a signal or information to a component indicates the final destination of the signal or information and does not mean a direct destination. The same is true for "reception" of the signal or information. In addition, in this specification, when two or more data or information are "related", it means that when one data (or information) is acquired, at least a part of the other data (or information) can be acquired based thereon.

In addition, terms such as the first and second may be used to describe various components, but the components should not be limited by the terms. The above terms may be used for the purpose of distinguishing one component from another component. For example, without departing from the scope of the present invention, a first component may be referred to as a second component, and similarly, the second component may also be referred to as the first component.

Figure 1:
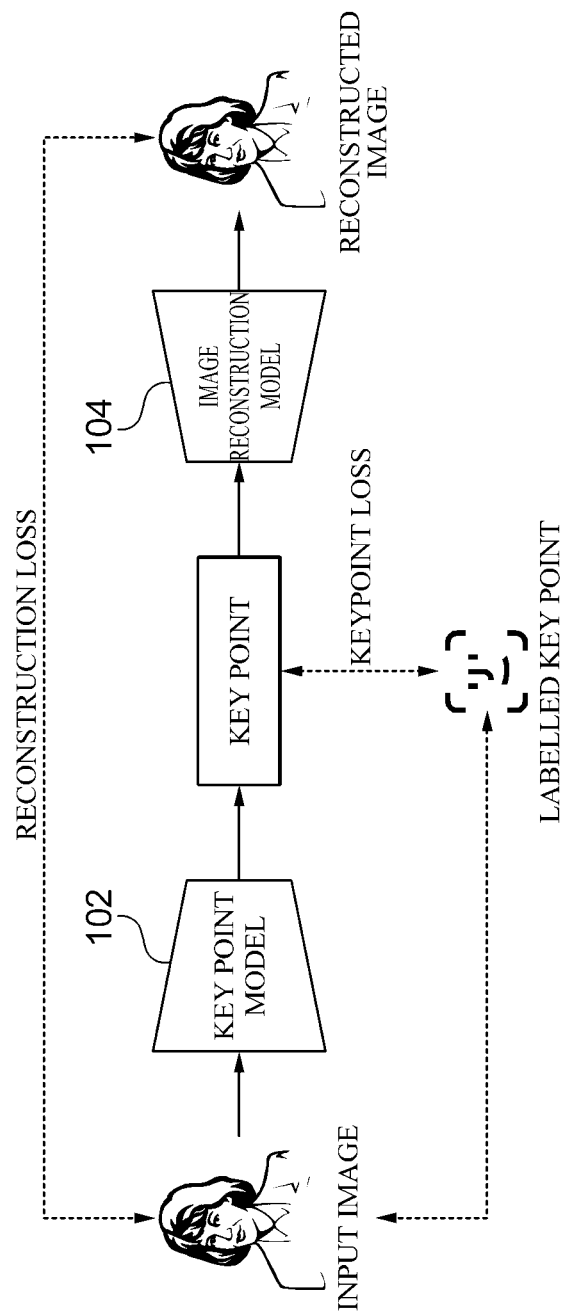
FIG. 1 is a block diagram schematically illustrating a configuration of a key point training apparatus according to an embodiment of the present invention.

FIG. 1 is a block diagram schematically illustrating a configuration of a key point training apparatus according to an embodiment of the present invention.

Referring to FIG. 1, a key point training apparatus 100 may include a key point model 102 and an image reconstruction model 104. In an exemplary embodiment, a case in which the key point training apparatus 100 extracts key points from a face image and reconstructs the face image based on the extracted key points is described as an example, but the present invention is not limited thereto and may be applied to various other images.

In addition, the key point training apparatus 100 may be implemented with a convolutional neural network (CNN)-based machine training technique, but the machine training technique is not limited the CNN-based machine training technique, and various other machine training techniques may be applied thereto. In addition, in an exemplary embodiment, the key point model 102 and the image reconstruction model 104 may be configured with an encoder-decoder type of neural network, but are not limited thereto.

The key point model 102 may be trained to extract key points from an image input (input image). In an exemplary embodiment, the input image may be an image including a face, but is not limited thereto. The key point model 102 may be trained to minimize differences between the key points extracted from the input image and key points labelled with respect to the input image (i.e., correct answer values).

In an exemplary embodiment, the key point model 102 may include one or more convolutional layers and one or more pooling layers. The convolution layer may extract feature values (i.e., key points) of pixels corresponding to a filter of a preset size (e.g., 3×3 pixel size) while moving the filter in the input image at regular intervals. The pooling layer may perform down sampling by receiving an output of the convolution layer as an input.

The image reconstruction model 104 may receive the key points output by the key point model 102. The image reconstruction model 104 may be trained to reconstruct the input image from the input key points. The image reconstruction model 104 may be trained to minimize a difference between an image reconstructed from the key points and the input image input to the key point model 102.

That is, the image reconstruction model 104 is trained to reconstruct the input image through the key points output by the key point model 102. In this case, the key point model 102 is primarily trained to minimize the differences between the key points extracted from the input image and the key points labelled for the input image, and is secondarily trained to extract the key points so that the difference between the input image and the reconstructed image reconstructed by the image reconstruction model 104 is minimized.

Here, since the input image itself does not have noise over time (i.e., annotation noise) unlike the key points, it is possible to extract key points that are continuous and stable over time while training is in progress. In addition, as the accuracy of key point extraction is increased and key points stable over time are extracted, quality of the reconstructed image reconstructed by the image reconstruction model 104 may also be improved.

Figure 2A:
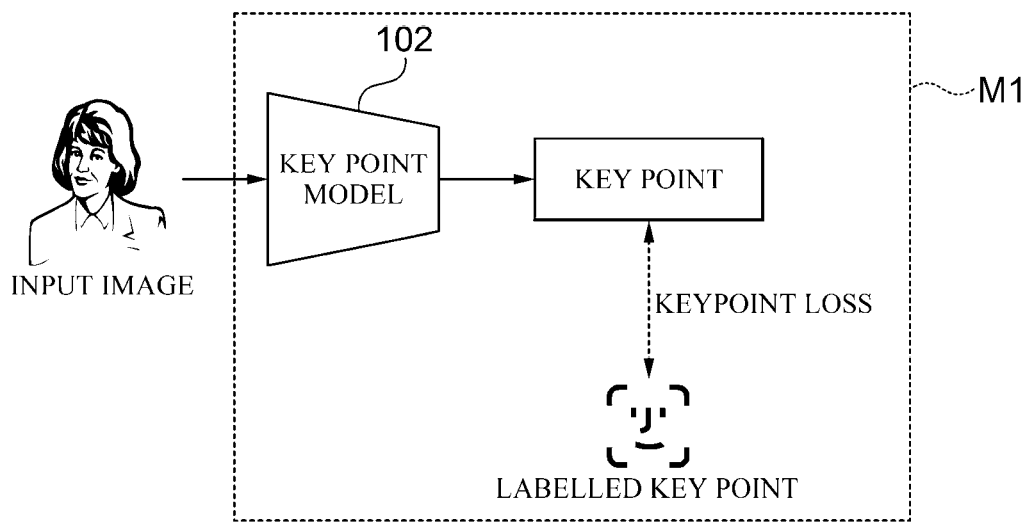
FIGS. 2A and 2B are diagrams schematically illustrating another training method of the key point training apparatus according to an embodiment of the present invention.
Figure 2B:
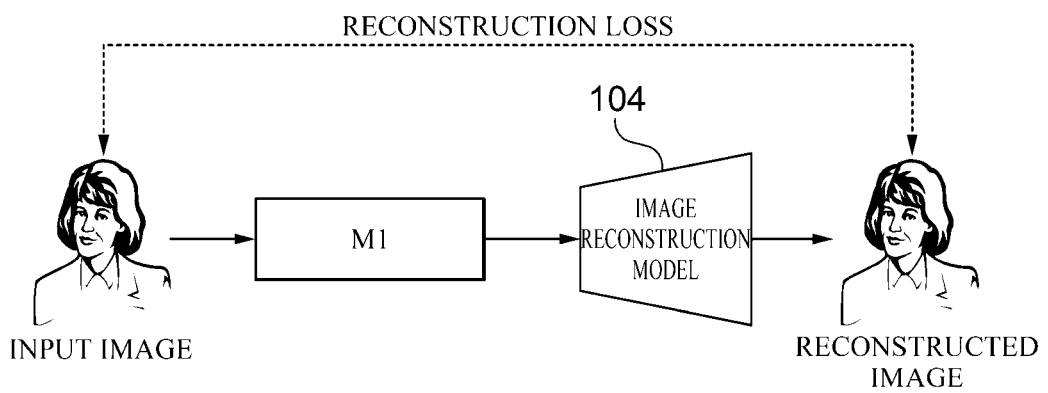

Meanwhile, in FIG. 1, a case in which the key point model 102 and the image reconstruction model 104 are simultaneously trained in one neural network model has been described as an example, but the present invention is not limited thereto. As illustrated in FIGS. 2A and 2B, it is possible to train a first machine learning model M1 so that the key point model 102 is allowed to extract the key points from the input image in a first machine learning model M1, but the differences between the extracted key points and the key points labelled with respect to the input image is minimized (FIG. 2A). In addition, by adding the image reconstruction model 104 to an output end of the trained first machine training model M1, the image reconstruction model 104 may be trained to reconstruct the input image based on the key points output from the first machine training model M1 (FIG. 2B). That is, after training the first machine training model M1 including the key point model 102, the image reconstruction model 104 may be added to the first machine training model M1.

Figure 3:
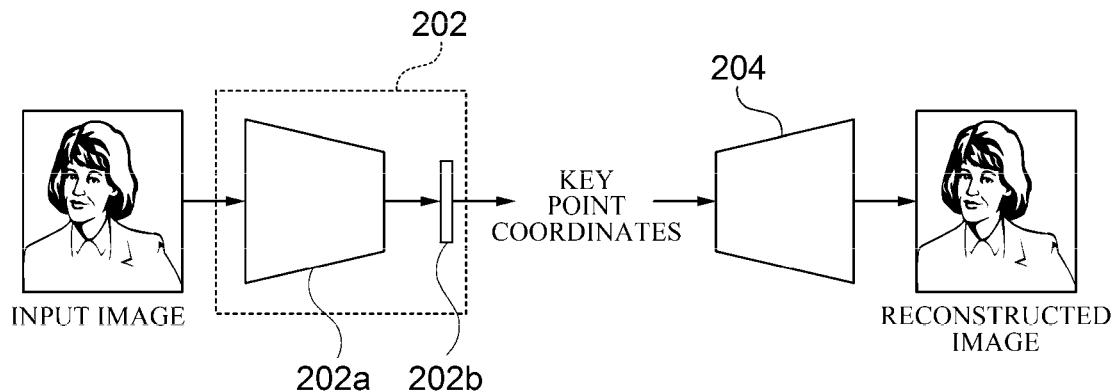
FIG. 3 is a block diagram illustrating a configuration of a key point training apparatus according to a first embodiment of the present invention.

FIG. 3 is a block diagram illustrating a configuration of a key point training apparatus according to a first embodiment of the present invention.

Referring to FIG. 3, a key point training apparatus 200 may include a key point model 202 and an image reconstruction model 204.

The key point model 202 may include an extraction module 202a and a prediction module 202b. The extraction module 202a may be trained to extract a feature vector from an input image. The extraction module 202a may extract the feature vector from the input image through a plurality of convolutional neural network layers. In an exemplary embodiment, the extraction module 202a may be configured with an image encoder.

The prediction module 202b may be trained to predict key point coordinates of the input image based on the feature vector extracted by the extraction module 202a. That is, the prediction module 202b may be trained to predict which coordinate values (x, y) correspond to a key point in a coordinate system of the input image based on the extracted feature vector Here, the key point coordinates K of the input image may be expressed by Equation 1 below.

$$K=[(x_1,y_1),(x_2,y_2),\ldots,(x_n,y_n)]$$ (Equation 1)

$x_n$: x-axis coordinate value of n-th key point
$y_n$: y-axis coordinate value of n-th key point Predicting and extracting key point coordinates from the input image in by the key point model 202 may be expressed through Equation 2 below.

$$K'=G(I;\theta)$$ (Equation 2)

Here, K' represents the key point coordinates predicted from the key point model 202, G represents the neural network constituting the key point model 202, I represents the input image, and θ represents the parameters of the neural network G.

The image reconstruction model 204 may be trained to reconstruct the input image based on key point coordinates output by the key point model 202. In an exemplary embodiment, the image reconstruction model 204 may be configured as a decoder.

Reconstructing the input image based on the key point coordinates by the image reconstruction model 204 may be expressed through Equation 3 below.

$$I'=D(K';\varphi)$$ (Equation 3)

Here, I' represents the image reconstructed by the image reconstruction model 204, D represents the neural network constituting the image reconstruction model 204, and φ represents the parameters of the neural network D Meanwhile, the key point model 202 may be trained to minimize the difference between the key point coordinates extracted from the input image and the labelled key point coordinates (i.e., the correct answer value). In addition, the image reconstruction model 204 may be trained to minimize the difference between the reconstructed image and the input image based on the key point coordinates extracted by the key point model 202.

In this case, an objective function $L_{prediction}$ of the key point model 202 may be expressed through Equation 4 below.

$$L_{prediction}=\|K-G(I;\theta)\|$$ (Equation 4)

K represents the labelled key point coordinates of the input image, and the ∥A−B∥ function is a function to find the difference between A and B (e.g., a function to find the Euclidean distance (L2 distance) or Manhattan distance (L1 distance) between A and B), etc.).

In addition, an objective function $L_{reconstruction}$ of the image reconstruction model 204 may be expressed through Equation 5 below.

$$L_{reconstruction}=\|I-D(G(I;\theta))\|$$ (Equation 5)

In addition, the optimized parameters (θ*,φ*) of the key point model 202 and the image reconstruction model 204 may be expressed through Equation 6 below.

$$\theta^*,\varphi^*=\operatorname{argmin}_{\theta,\varphi}(\alpha L_{prediction}+\beta L_{reconstruction})$$ (Equation 6)

Here, $\text{argmin}_{\theta,\varphi}(A+B)$ denotes a function to find $\theta$ and $\varphi$ that minimize $(A+B)$. $\alpha$ denotes the weight of the objective function of the key point model 202 and $\beta$ denotes the weight of the objective function of the image reconstruction model 204.

Figure 4:
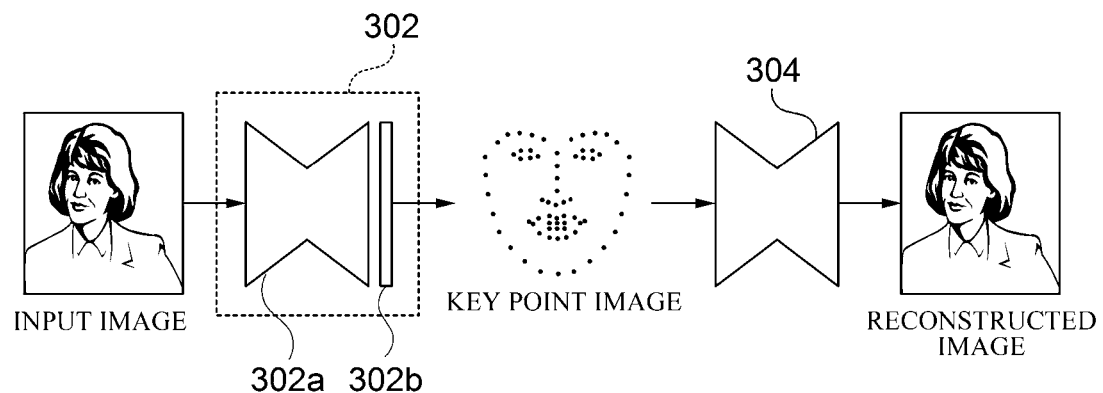
FIG. 4 is a block diagram illustrating a configuration of a key point training apparatus according to a second embodiment of the present invention.

FIG. 4 is a block diagram illustrating a configuration of a key point training apparatus according to a second embodiment of the present invention.

Referring to FIG. 4, a key point training apparatus 300 may include a key point model 302 and an image reconstruction model 304.

The key point model 302 may include an extraction module 302a and a prediction module 302b. The extraction module 302a may be trained to extract a feature tensor from an input image. The extraction module 302a may extract the feature tensor so that the key point is expressed as a point on an image space corresponding to the input image. By configuring the extraction module 302a with an encoder-decoder type neural network, it is possible to increase the efficiency of an image-to-image training scheme.

The prediction module 302b may be trained to predict a key point image based on the feature tensor extracted by the extraction module 302a. Here, the key point image indicates whether or not each pixel corresponds to the key point in the image space corresponding to the input image. The key point image may be an image in which, for each pixel, a pixel value is 1 if each pixel corresponds to the key point and a pixel value is 0 if each pixel does not correspond to the key point.

In an exemplary embodiment, the prediction module 302b may predict the key point image by outputting a probability value between 0 and 1 (i.e., a probability value of whether or not each pixel is a key point) for each pixel based on the extracted feature tensor. Outputting a probability value for each pixel by the prediction module 302b may be expressed through Equation 7 below.

$$p(x_i,y_i) = \text{probability distribution } (P(F(x_i,y_i);\delta)) \quad \text{(Equation 7)}$$

Here, $p(x_i,y_i)$ denotes a probability value of whether or not a pixel $(x_i,y_i)$ is a key point, P denotes a neural network constituting the key point model 302, $F(x_i,y_i)$ denotes a feature tensor of the pixel $(x_i,y_i)$, and $\delta$ denotes the parameter of the neural network P. In addition, as the probability distribution function, Sigmoid, Gaussian, etc. may be used, but is not limited thereto.

Meanwhile, the objective function $L_{prediction}$ of the key point model 302 may be expressed through Equation 8 below.

$$L_{prediction} = -\Sigma\{p_{target}(x_i,y_i)\log(p(x_i,y_i)) + (1-p_{target}(x_i,y_i))\log(1-p(x_i,y_i))\} \quad \text{(Equation 8)}$$

Here, $p_{target}(x_i,y_i)$ denotes a value of whether or not the pixel $(x_i,y_i)$ of the input image is a labelled key point. That is, it may be labelled to have a value of 1 when the corresponding pixel is a key point and have a value of 0 when it is not the key point.

According to Equation 8, when the value of whether or not the pixel is the labelled key point is 1, it is trained to increase the probability value (i.e., $p(x_i,y_i)$) of whether or not the pixel is the key point, and when the value of whether or not the pixel is the labelled key point is 0, it is trained to reduce the probability value (i.e., $p(x_i,y_i)$) of whether or not the pixel is the key.

The image reconstruction model 304 may be trained to reconstruct the input image based on the key point image output by the key point model 302. In an exemplary embodiment, the image reconstruction model 304 may be configured with an encoder-decoder type of neural network. The objective function $L_{reconstruction}$ of the image reconstruction model 304 may be expressed through Equation 9 below.

$$L_{reconstruction} = \|I - H(P(I;\delta);\eta)\| \quad \text{(Equation 9)}$$

Here, I denotes an input image, H denotes a neural network constituting the image reconstruction model 304, and $\eta$ denotes a parameter of the neural network H.

In addition, the optimized parameters $(\delta^*/\eta^*)$ of the key point model 302 and the image reconstruction model 304 may be expressed through Equation 10 below.

$$\delta^*,\eta^* = \text{argmin}_{\delta,\eta}(\alpha L_{prediction} + \beta L_{reconstruction}) \quad \text{(Equation 10)}$$

Meanwhile, in this specification, a module may mean a functional and structural combination of hardware for performing the technical idea of the present invention and software for driving the hardware. For example, the "module" may mean a logical unit of a predetermined code and a hardware resource for executing the predetermined code, and does not necessarily mean physically connected code or a single type of hardware.

Figure 5:
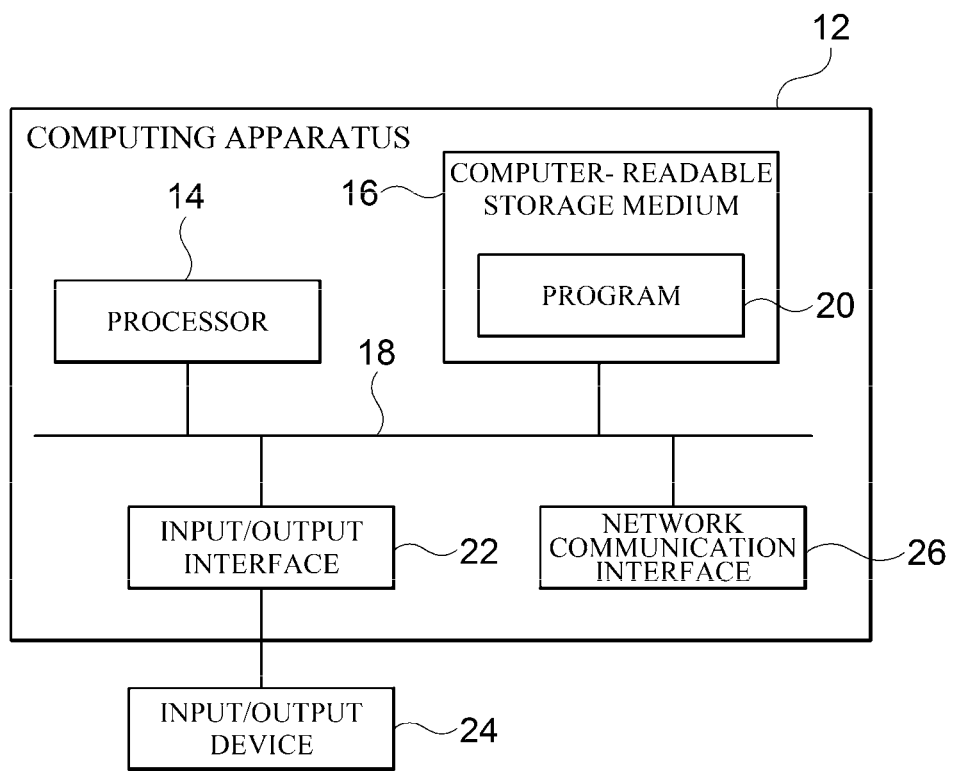
FIG. 5 is a block diagram illustratively describing a computing environment including a computing device suitable for use in example embodiments.

FIG. 5 is a block diagram illustratively describing a computing environment 10 including a computing apparatus suitable for use in exemplary embodiments. In the illustrated embodiment, respective components may have different functions and capabilities other than those described below, and may include additional components in addition to those described below.

The illustrated computing environment 10 includes a computing apparatus 12. In an embodiment, the computing apparatus 12 may be the key point training apparatus 100, 200, or 300.

The computing apparatus 12 includes at least one processor 14, a computer-readable storage medium 16, and a communication bus 18. The processor 14 may cause the computing apparatus 12 to operate according to the exemplary embodiment described above. For example, the processor 14 may execute one or more programs stored on the computer-readable storage medium 16. The one or more programs may include one or more computer-executable instructions, which, when executed by the processor 14, may be configured such that the computing apparatus 12 performs operations according to the exemplary embodiment.

The computer-readable storage medium 16 is configured such that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing apparatus 12 and capable of storing desired information, or any suitable combination thereof.

The communication bus 18 interconnects various other components of the computing apparatus 12, including the processor 14 and the computer-readable storage medium 16.

The computing apparatus 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing apparatus 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing apparatus 12 as a component constituting the computing apparatus 12, or may be connected to the computing apparatus 12 as a separate device distinct from the computing apparatus 12.

Although representative embodiments of the present invention have been described in detail, those skilled in the art to which the present invention pertains will understand that various modifications may be made thereto within the limits that do not depart from the scope of the present invention. Therefore, the scope of rights of the present invention should not be limited to the described embodiments, but should be defined not only by claims set forth below but also by equivalents to the claims.

What is claimed is:

1. A neural network-based key point training apparatus comprising:
   a key point model trained to extract key points from an input image; and
   an image reconstruction model trained to reconstruct the input image with the key points output by the key point model as the input,
   wherein the key point model comprises:
   an extraction module trained to extract a feature vector from the input image; and
   a prediction module trained to predict key point coordinates of the input image based on the feature vector extracted by the extraction module; and
   the image reconstruction model is trained to reconstruct the input image based on the key point coordinates output by the key point model,
   wherein optimized parameters of the key point model and the image reconstruction model are calculated through the following equation:

$$\theta^*, \varphi^* = \mathrm{argmin}_{\theta,\varphi}(\alpha L_{prediction} + \beta L_{reconstruction}) \quad \text{(Equation)}$$

where, $\theta^*$: optimized parameter of key point model;
   $\varphi^*$: optimized parameter of image reconstruction model;
   $L_{prediction}$: objective function of key point model, $$L_{prediction} = \|K - G(I;\theta)\|;$$

K: labelled key point coordinates of input image;
   G: neural network constituting key point model;
   $\theta$: parameter of the key point model;
   I: input image;
   $G(I;\theta)$: key point coordinates predicted from key point model;
   $\|K-G(I;\theta)\|$: function to find difference between key point coordinates predicted from key point model and labelled key point coordinates of input image;
   $L_{reconstruction}$: objective function of image reconstruction model, $L_{reconstruction} = \|I - D(G(I;\theta);\varphi)\|$;
   D: neural network constituting image reconstruction model;
   $\varphi$: parameter of image reconstruction model;
   $\|I - D(G(I;\theta);\varphi)\|$: function to find difference between input image and image reconstructed by image reconstruction model;
   $\alpha$: weight of objective function of key point model; and
   $\beta$: weight of objective function of image reconstruction model.

2. The apparatus according to claim 1, wherein the key point model is trained to minimize differences between the extracted key points and key points labelled with respect to the input image; and
   the image reconstruction model is trained to minimize a difference between the reconstructed image and the input image.

3. The apparatus according to claim 2, wherein the key point model is primarily trained to minimize the differences between the extracted key points and the key points labelled with respect to the input image and is secondarily trained to extract the key point so that a difference between the reconstructed image and the input image is minimized.

4. A neural network-based key point training apparatus comprising:
   a key point model trained to extract key points from an input image; and
   an image reconstruction model trained to reconstruct the input image with the key points output by the key point model as the input,
   wherein the key point model comprises:
   an extraction module trained to extract a feature tensor from the input image; and
   a prediction module trained to predict a key point image based on the feature tensor extracted by the extraction module; and
   the image reconstruction model is trained to reconstruct the input image based on the key point image output by the key point model,
   wherein the key point image is an image indicating whether or not each pixel corresponds to the key point in an image space corresponding to the input image as a probability value,
   wherein an objective function $L_{prediction}$ of the key point model is expressed through the following equation:

$$L_{prediction} = -\Sigma\{p_{target}(x_i,y_i)\log(p(x_i,y_i)) + (1-p_{target}(x_i,y_i))\log(1-p(x_i,y_i))\} \quad \text{(Equation)}$$

where, $p(x_i,y_i)$: probability value of whether or not pixel $p(x_i, y_i)$ is key point;
   $p(x_i,y_i) = $ probability distribution $(P(F(x_i,y_i); \delta))$;
   P: neural network constituting key point model;
   $F(x_i,y_i)$: feature tensor of pixel $(x_i, y_i)$;
   $\delta$: parameter of key point model; and
   $p_{target}(x_i,y_i)$: value of whether or not pixel $(x_i,y_i)$ of the input image is labelled key point,
   wherein optimized parameters of the key point model and the image reconstruction model are calculated through the following equation:

$$\delta^*, \eta^* = \mathrm{argmin}_{\delta,\eta}(\alpha L_{prediction} + \beta L_{reconstruction}) \quad \text{(Equation)}$$

where, $\delta^*$: optimized parameter of key point model;
   $\eta^*$: optimized parameter of image reconstruction model;
   $\alpha$: weight of objective function of key point model;
   $\beta$: weight of objective function of image reconstruction model;
   $L_{reconstruction}$: objective function of the image reconstruction model, $L_{reconstruction} = \|I - H(P(I;\delta);\eta)\|$;
   I: input image;
   H: neural network constituting image reconstruction model; and
   $\eta$: parameters of image reconstruction model.

* * * * *